(12) United States Patent
Venkatesh et al.

(10) Patent No.: US 10,876,505 B1
(45) Date of Patent: Dec. 29, 2020

(54) VEHICLE FUELING CONTROL SYSTEM AND CONTROL METHOD

(71) Applicant: Ford Global Technologies, LLC, Dearborn, MI (US)

(72) Inventors: Roshini Venkatesh, Canton, MI (US); Brent Edward Sealy, Canton, MI (US); David Martin, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/571,467

(22) Filed: Sep. 16, 2019

(51) Int. Cl.
| | |
|---|---|
| B67D 7/04 | (2010.01) |
| F02M 37/16 | (2006.01) |
| F02M 37/00 | (2006.01) |
| B60K 15/01 | (2006.01) |
| B60K 15/04 | (2006.01) |
| B67D 7/42 | (2010.01) |
| B67D 7/54 | (2010.01) |
| B60K 15/03 | (2006.01) |

(52) U.S. Cl.
CPC ....... *F02M 37/0023* (2013.01); *B60K 15/013* (2013.01); *B60K 15/04* (2013.01); *B67D 7/048* (2013.01); *B67D 7/421* (2013.01); *B67D 7/54* (2013.01); *F02M 37/16* (2013.01); *B60K 2015/0344* (2013.01)

(58) Field of Classification Search
CPC .. F02M 37/0023; F02M 37/16; B60K 15/013; B60K 15/04; B60K 2015/0344; B67D 7/48; B67D 7/52; B67D 7/54

USPC .......................................................... 123/445
See application file for complete search history.

(56) References Cited

U.S. PATENT DOCUMENTS

| | | | | | |
|---|---|---|---|---|---|
| 3,312,257 | A | * | 4/1967 | Knapp, II | B67D 7/48 141/214 |
| 4,016,910 | A | * | 4/1977 | Dumpis | B67D 7/48 141/226 |
| 4,204,563 | A | * | 5/1980 | Pyle | B67D 7/42 141/1 |
| 4,593,729 | A | * | 6/1986 | Tamra | B67D 7/48 141/218 |
| 4,809,753 | A | * | 3/1989 | Fink, Jr. | B67D 7/42 141/206 |
| 5,174,346 | A | | 12/1992 | Healy | |
| 5,327,949 | A | * | 7/1994 | Dotson | B67D 7/42 141/206 |
| 6,189,581 | B1 | * | 2/2001 | Harris | B60K 15/04 137/588 |
| 10,190,348 | B2 | | 1/2019 | Pearce et al. | |
| 2015/0096983 | A1 | | 4/2015 | Moy et al. | |
| 2018/0037452 | A1 | * | 2/2018 | Gray | B67D 7/52 |
| 2018/0281587 | A1 | * | 10/2018 | Jiang | B60K 15/035 |

* cited by examiner

*Primary Examiner* — Mahmoud Gimie
(74) *Attorney, Agent, or Firm* — David Kelley, Esq.; Carlson, Gaskey & Olds, P.C.

(57) ABSTRACT

A vehicle fueling control system according to an exemplary aspect of the present disclosure includes, among other things, a fuel inlet conduit configured to receive a fuel dispensing nozzle, and a blocking assembly. The blocking assembly is configured to move back and forth between a fill blocking position that blocks airflow through a port of the fuel dispensing nozzle and a fill permitting position that permits airflow through the port of the fuel dispensing nozzle.

18 Claims, 6 Drawing Sheets

VEHICLE FUELING CONTROL SYSTEM AND CONTROL METHOD

TECHNICAL FIELD

This disclosure relates generally to blocking fueling a vehicle until a fuel system of the vehicle reaches an appropriate pressure.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The fuel system of some vehicles, such as HEVs and PHEVs, can be a Non-Integrated Refueling Canister Only System (NIRCOS).

SUMMARY

A vehicle fueling control system according to an exemplary aspect of the present disclosure includes, among other things, a fuel inlet conduit configured to receive a fuel dispensing nozzle, and a blocking assembly. The blocking assembly is configured to move back and forth between a fill blocking position that blocks airflow through a port of the fuel dispensing nozzle and a fill permitting position that permits airflow through the port of the fuel dispensing nozzle.

In a further embodiment of the foregoing system, the port is a Venturi port of the fuel dispensing nozzle.

In a further embodiment of any of the foregoing systems, the fuel dispensing nozzle extends along a longitudinal axis to a fuel nozzle outlet. The port opens to a radially facing side of the fuel dispensing nozzle.

A further embodiment of any of the foregoing systems includes a clamping device of the blocking assembly. The clamping device contacts the fuel dispensing nozzle to cover the port when the blocking assembly is in the fill blocking position. The clamping device is moved to a position spaced from the port when in the fill permitting position.

In a further embodiment of any of the foregoing systems, the clamping device extends circumferentially about the fuel dispensing nozzle.

In a further embodiment of any of the foregoing systems, the clamping device includes an inflatable device. The inflatable device is more inflated when in the fill blocking position than when in the fill permitting position.

In a further embodiment of any of the foregoing systems, the inflatable device is more inflated when a pressure inside a fuel tank is higher and is less inflated when a pressure inside the fuel tank is lower.

In a further embodiment of any of the foregoing systems, the inflatable device inflates and deflates in response to a pressure inside a fuel tank.

A further embodiment of any of the foregoing systems includes a deflecting device of the blocking assembly. The deflecting device is configured to redirect fuel exiting the fuel dispensing nozzle to an area where the fuel blocks airflow through the port when the blocking assembly is in the fill blocking position.

A further embodiment of any of the foregoing systems includes an actuator that transitions the blocking assembly to the fill permitting position in response to a pressure within a fuel tank.

In a further embodiment of any of the foregoing systems, the deflecting device is rotated by the actuator back and forth between the fill blocking position and the fill permitting position.

A vehicle fueling control method according to another exemplary aspect of the present disclosure includes, among other things, transitioning a blocking assembly to a fill blocking position where the blocking assembly blocks airflow through a port of fuel dispensing nozzle to restrict a flow of fuel from the fuel dispensing nozzle to a fuel tank. The method further including transitioning the blocking assembly to a fill permitting position that permits airflow through the port so that the flow of fuel can move from the fuel dispensing nozzle.

A further embodiment of the foregoing method includes transitioning back and forth between the fill blocking position and the fill permitting position in response to a pressure within the fuel tank.

In a further embodiment of any of the foregoing methods, the port is a Venturi port of the fuel dispensing nozzle.

A further embodiment of any of the foregoing methods includes clamping the blocking assembly against the fuel dispensing nozzle when the blocking assembly is in the fill blocking position, and moving the blocking assembly to a position spaced from the port when the blocking assembly is in the fill permitting position.

A further embodiment of any of the foregoing methods includes inflating the blocking assembly to cause the clamping, and deflating the blocking assembly to cause the removing.

In a further embodiment of any of the foregoing methods, an increase in a pressure of a fuel tank inflates the blocking assembly and a decrease in the pressure of the fuel tank deflates the blocking assembly.

A further embodiment of any of the foregoing methods includes redirecting fuel exiting the fuel dispensing nozzle to an area where the fuel blocks airflow through the port when blocking airflow.

A further embodiment of any of the foregoing methods includes pivoting a deflecting device to a position where the deflecting device provides the redirecting, and pivoting the deflecting device away from the position when removing the blocking.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to controlling a flow of fuel to a vehicle fuel tank. In particular, the disclosure details embodiments that use blocking assemblies to block flow from a fuel dispensing nozzle until a fuel system is at a pressure appropriate for refueling.

Figure 1:
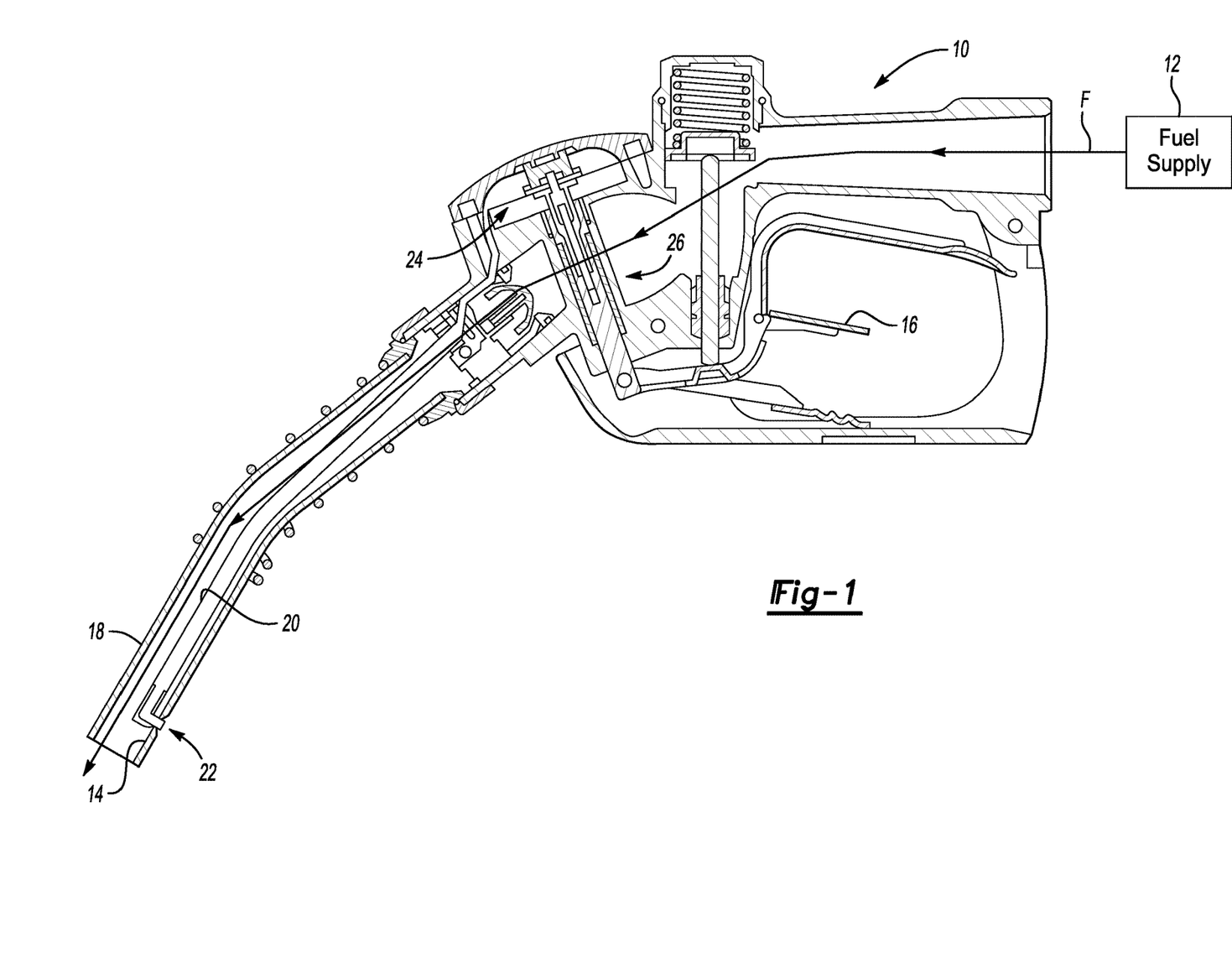
FIG. 1 illustrates a section view of an exemplary fuel dispensing nozzle.
Figures 2, 3:
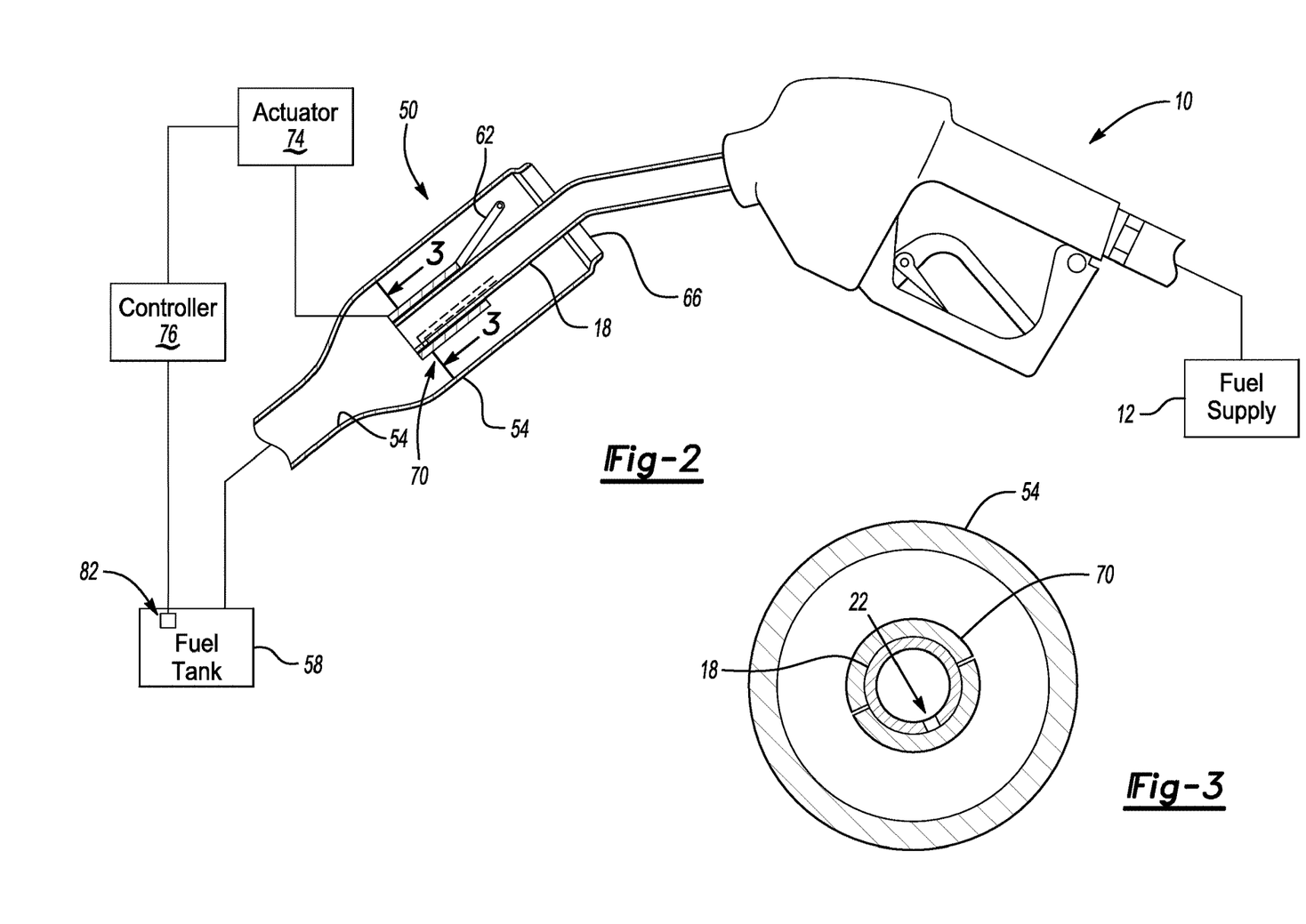
FIG. 2 illustrates a schematic view of a vehicle fueling control system utilized in connection with the fuel dispensing nozzle of FIG. 1 when the vehicle fuel filler control system is in a fill blocking position.
FIG. 3 illustrates a section view at line 3-3 in FIG. 2.
Figures 4, 5:
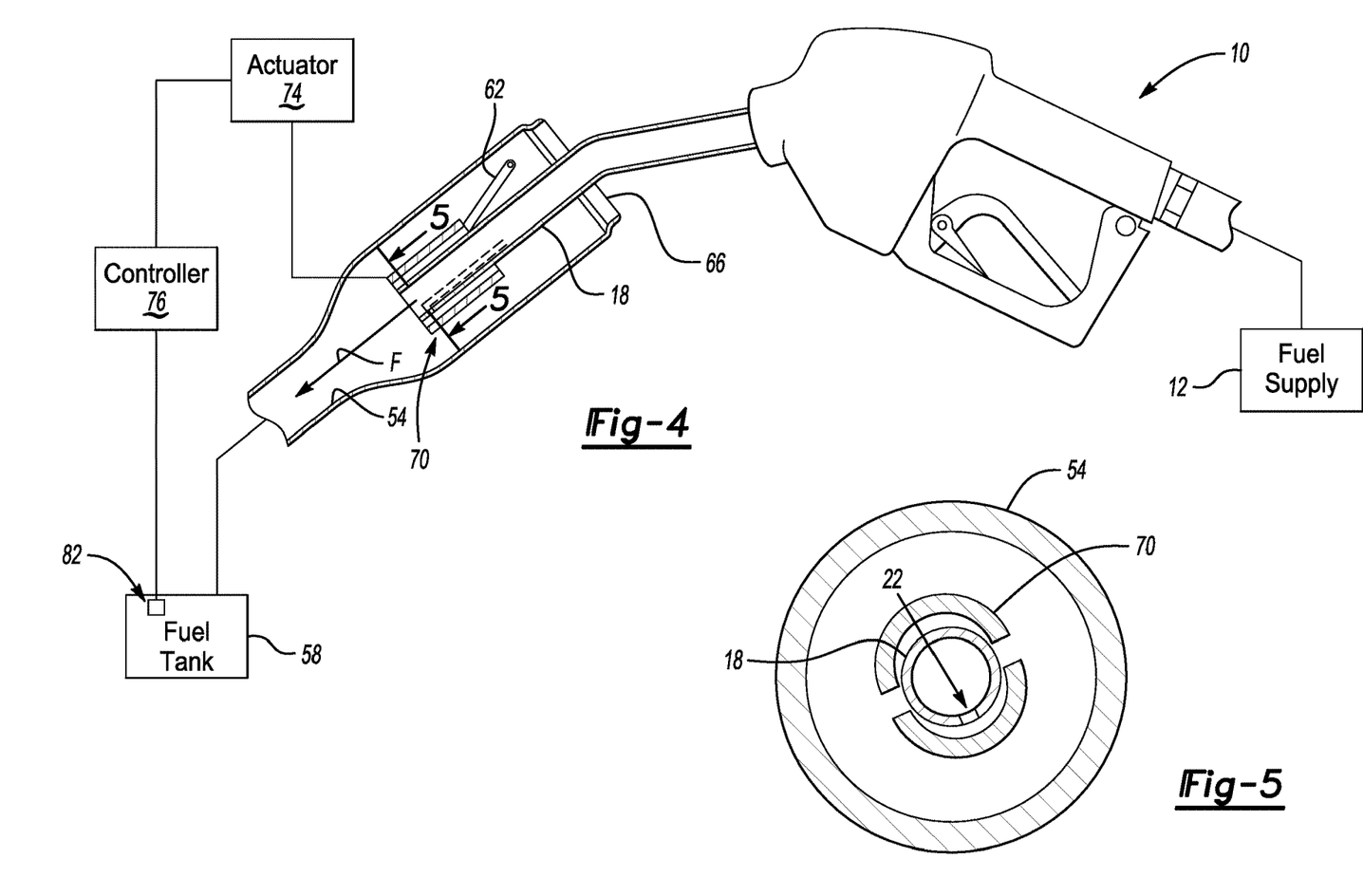
FIG. 4 illustrates the vehicle fueling control system and fuel dispensing nozzle of FIG. 2 when the vehicle fueling control system is in a fill permitting position.
FIG. 5 illustrates a section view taken at line 5-5 in FIG. 4.

A section view of a fuel dispensing nozzle 10 is shown in FIG. 1. The fuel dispensing nozzle 10 can be used to deliver a flow of fuel F from a fuel supply 12. The fuel F moves through the fuel dispensing nozzle 10 and exits the fuel dispensing nozzle 10 at a fuel dispensing outlet 14.

The fuel dispensing nozzle 10 includes a trigger 16. A user can actuate the trigger 16 when delivering fuel through the fuel dispensing nozzle 10 is desired.

The fuel dispensing nozzle 10 may automatically shut-off the delivery of fuel even when the trigger 16 is actuated by the user. The fuel dispensing nozzle 10 may automatically shut-off because, for example, the fuel tank is full of fuel. Automatically shutting off the fuel dispensing nozzle 10 can prevent fuel spilling.

The automatic shut-off mechanism includes, among other things, a vacuum tube 20 extending to a port 22 from a vacuum chamber 24. The vacuum tube 20 extends within the spout 18 of the fuel dispensing nozzle 10.

While fuel F moves through the spout 18 and exits the fuel dispensing nozzle 10 at the outlet 14, air can move through the port 22 and along the vacuum tube 20 to the vacuum chamber 24. A Venturi creates suction at the port 22, which draws air into the vacuum tube 20 and into the vacuum chamber 24. This holds an auto shut-off valve 26 of the fuel dispensing nozzle 10 in an open position. In the open position, the fuel F can move through the fuel dispensing nozzle 10. The port 22 is considered an aspirator in come examples.

As a fuel tank becomes full and a level of fuel within the fuel tank rises, the fuel eventually covers the port 22. This changes the pressure within the vacuum chamber 24, which causes the shut-off valve 26 to move to a closed position where the shut-off valve prevents fuel F from moving through the outlet 14. A person having skill in this art would understand the automatic shut-off feature of the fuel dispensing nozzle 10.

With reference now to FIGS. 2-5 and continuing reference to FIG. 1, a section view of selected portions of a fuel system 50 of a vehicle is shown. The vehicle is a hybrid vehicle in this example. Further, the fuel system 50 is a non-integrated refueling canister only system (NIRCOS). As understood, the NIRCOS contains fuel vapors when a user is not refueling the vehicle. Raising or lowering pressures within the fuel system 50, and particularly the fuel tank, may be necessary prior to refueling a vehicle with the NIRCOS.

The fuel system 50 includes a fuel inlet conduit 54, a fuel tank 58, and a guard 62. To deliver fuel from the fuel supply 12 to the fuel tank 58, the fuel dispensing nozzle 10 can be inserted through an inlet opening 66 of the fuel inlet conduit 54. Inserting the spout 18 of the fuel dispensing nozzle 10 through the inlet opening 66 and into the fuel inlet conduit 54 presses against the guard 62 to pivot the guard 62 out of the way.

The fuel system 50 incorporates a fueling control system that blocks the fuel dispensing nozzle 10 from dispensing significant fuel until a pressure of the fuel tank 58 is at an appropriate level. If, for example, substantial amounts of fuel were dispensed when a pressure of the fuel tank 58 is too high, fuel could splash back out through the fuel inlet conduit 54.

The fueling control system includes, among other things, a blocking assembly 70, an actuator 74, a controller 76, and a pressure sensor 82. The actuator 74 can move the blocking assembly 70 from the fill blocking position shown in FIGS. 2 and 3 to the fill permitting position shown in FIGS. 4 and 5. In the fill blocking position, the blocking assembly 70 clamps against an outer surface of the spout 18 to cover the port 22. Covering the port 22 prevents air from entering the port 22, which causes the shut-off valve 26 to move to the closed position and stop fuel from flowing through the fuel dispensing nozzle 10.

The controller 76 can receive a signal from the pressure sensor 82 indicating a pressure within the fuel tank 58 or a pressure within another portion of the fuel system. When the controller 76 receives a signal indicating that a pressure has been lowered to a level appropriate for refueling, the controller 76 signals the actuator 74 to transition the blocking assembly 70 from the position of FIGS. 2 and 3 to the position of FIGS. 4 and 5.

The transitioning involves moving the blocking assembly 70 outward to a position where the blocking assembly 70 is spaced from the port 22. This permits the Venturi to draw air through the port 22, which moves the shut-off valve 26 to an open position that permits the flow of fuel F into the fuel tank 58.

After sufficient fuel F has moved to the fuel tank 58, a level of the fuel gradually rises within the fuel inlet conduit 54 until the fuel F covers the port 22. This shuts off the delivery of fuel from the fuel dispensing nozzle 10. A user can then remove the fuel dispensing nozzle 10 from the fuel inlet conduit 54.

The blocking assembly 70 is a clamping device in this example. The blocking assembly 70 includes two hemispherical-shaped sections each moveable by the actuator back and forth between the fill blocking position of FIGS. 2 and 3 and the fill permitting position of FIGS. 4 and 5. The clamping device extends circumferentially about substantially an entire periphery of the spout 18 when the clamping device is in the fill blocking position.

Various types of actuators 74 could be utilized to transition the blocking assembly 70 back and forth between the fill permitting and fill blocking positions. The actuator 74 could be a linear actuator, for example.

Figure 6:
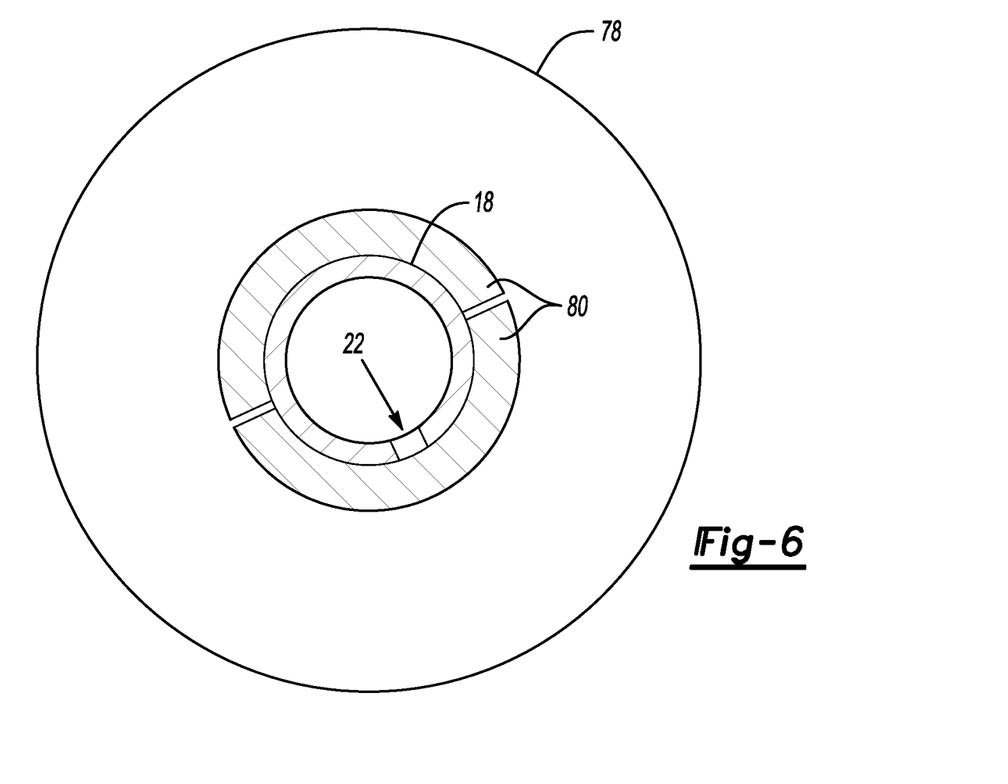
FIG. 6 illustrates selected portions of a vehicle fueling control system according to another exemplary aspect of the present disclosure when the vehicle fueling control system is in a fill blocking position.
Figure 7:
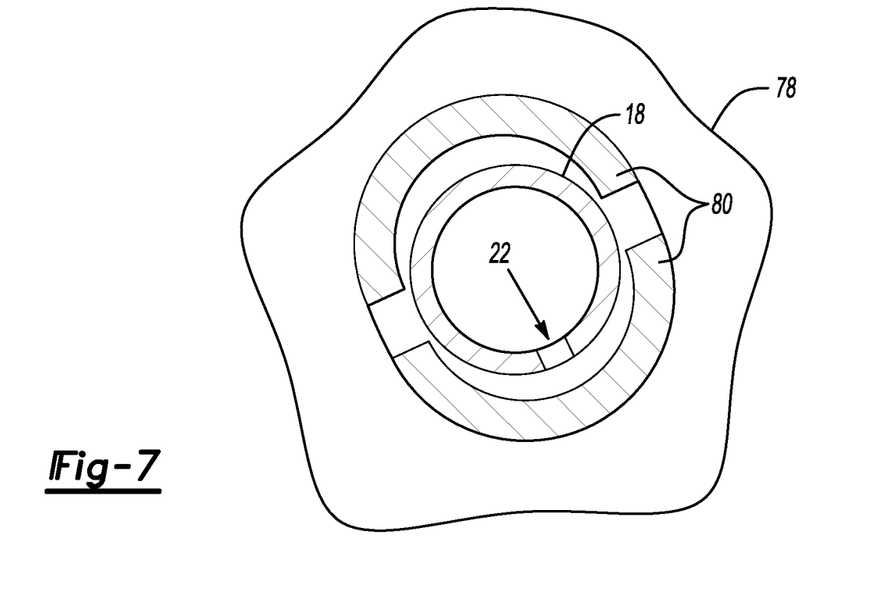
FIG. 7 illustrates selected portions of the fuel filler control system of FIG. 6 in a fill permitting position.

Referring now to FIGS. 6 and 7, the blocking assembly 70 could include an inflatable device. For example, the blocking assembly 70 could include a bladder 78 and a sleeve 80. The bladder 78 is inflated when in the fill blocking position and deflated when in the fill permitting position. Inflating the bladder 78 can move the sleeve 80 against the spout 18 to cover the port 22.

The bladder 78 can be a ring-shaped bladder, for example. After the spout 18 of the fuel dispensing nozzle 10 is inserted in the aperture of such a bladder, the bladder 78 is inflated to move the sleeve 80 against the spout 18, which covers the port 22 as shown in FIG. 6. When the pressure is appropriate for refueling the bladder 78 can be deflated as shown in FIG. 7 to move the sleeve 80 away from the port 22.

In some example, a pressure within the bladder 78 could be higher when a pressure inside the fuel tank 58 is higher. Correspondingly, a pressure inside the bladder 78 could be lower when a pressure inside the fuel tank 58 is lower. The pressure within the bladder 78 could be operatively linked to the fuel tank 58 or another portion of the fuel system such that a pressure within the bladder 78 inflates and deflates in response to a pressure inside the fuel tank.

Figure 8:
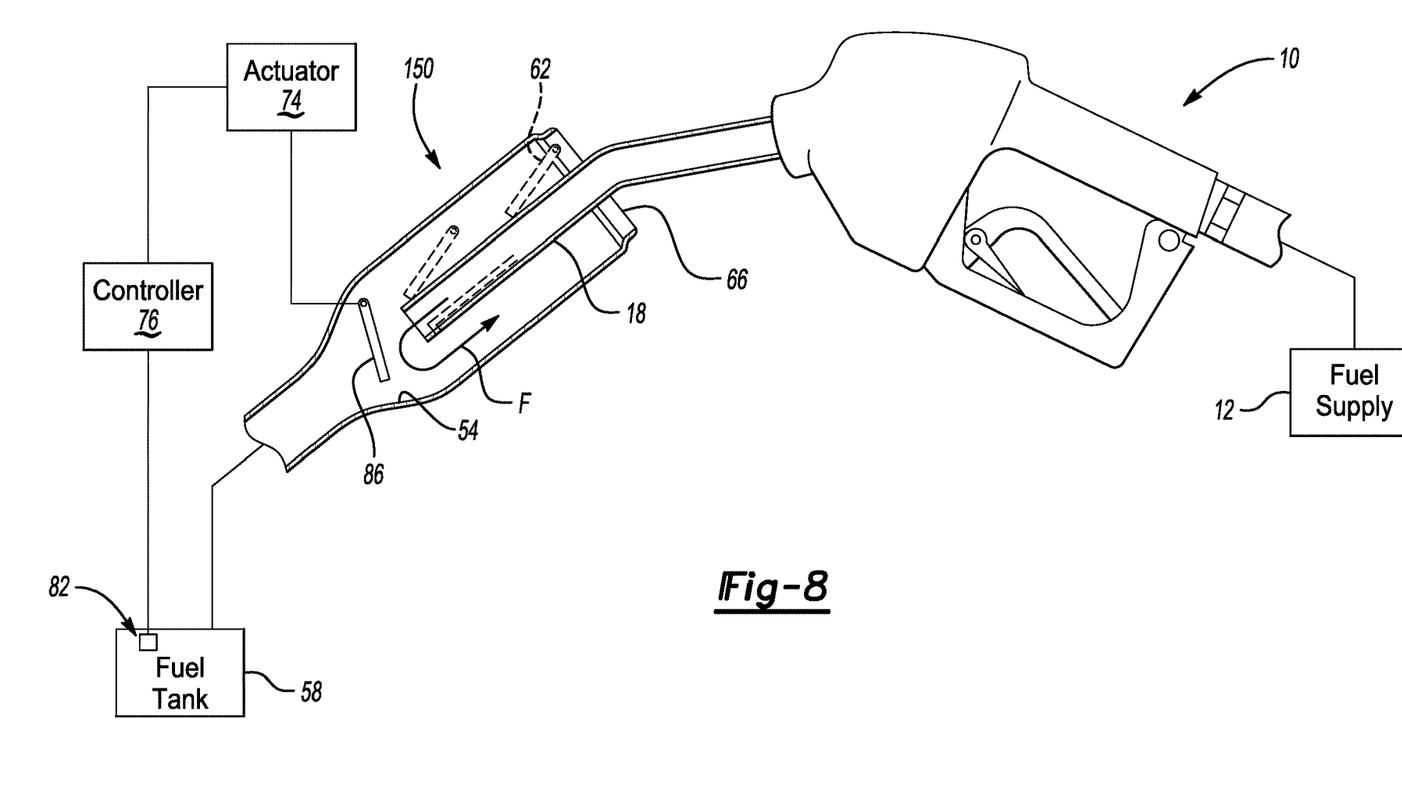
FIG. 8 illustrates a vehicle fueling control system according to another yet exemplary aspect of the present disclosure when the vehicle fueling control system is in a fill blocking position.
Figure 9:
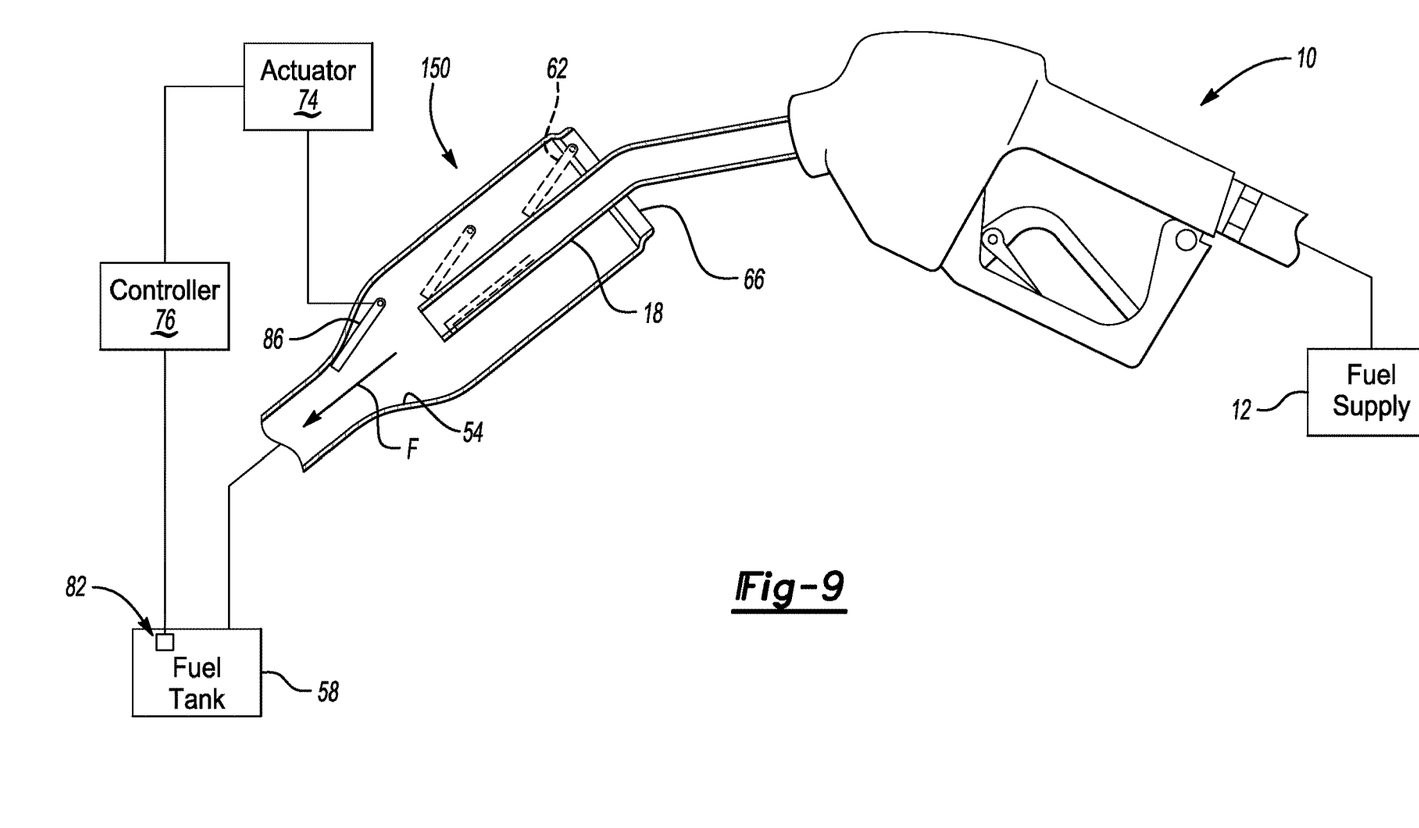
FIG. 9 illustrates the vehicle fueling control system of FIG. 8 when the vehicle fueling control system is in the fill permitting position.

With reference now to FIGS. 8 and 9, another exemplary fuel filler control system 150 includes a deflecting device 86 as the blocking assembly. When a pressure in the fuel tank 58 is at a level inappropriate for refueling, the controller 76 signals the actuator 74 to move the deflecting device 86 to the position of FIG. 8, which is a fill blocking position. When the deflector device 86 is in the fill blocking position of FIG. 8, the flow of fuel F exiting the spout 18 contacts the deflecting device 86 and is deflected such that the fuel F moves over the port 22. This leads to the pressure differential that causes the auto shut-off valve 26 to close.

After the controller 76 determines that a pressure within the fuel tank 58 is appropriate for refueling, the actuator 74 is commanded to move to the fill permitting position. In the fuel permitting position, the deflector device 86 is rotated to the position of FIG. 9 where the deflector device 86 does not deflect fuel F over the port 22.

The deflecting device 86 can be rotated back and forth between the fill blocking position of FIG. 8 and the fill permitting position of FIG. 9 by the actuator 74. When the deflecting device 86 is in the fill permitting position, the fuel F is free to move from the spout 18 into the fuel tank 58.

The controller 76 used in connection with the above embodiments can be a microcontroller unit (MCU). The controller 76 could include a single controller module, or selected portions of a plurality of different controller modules.

The controller 76 can include, among other things, a processor and a memory portion. The processor can be programmed to execute a program stored in the memory portion. The processor can be a custom made or commercially available processor, a central processing unit (CPU), an auxiliary processor among several processors associated with the controller 76, a semiconductor based microprocessor (in the form of a microchip or chipset) or generally any device for executing software instructions.

The memory portion can include any one or combination of volatile memory elements. Programs can be stored in the memory portion as software code and used to initiate, for example, a fuel tank depressurization and a transitioning of the blocker back and for the between the blocking position and the accessing position. The programs can include one or more additional or separate programs, each of which includes an ordered list of executable instructions for implementing logical functions associated with control of fuel system.

Features of the disclosed embodiments include a system that blocks filling a fuel tank until pressures are an appropriate level. In the past, some designs locked a fuel door to prevent the user from attempting a fill when the fuel tank was not at a pressure appropriate for refilling. The position of the fuel door needed to be determined to know when the fuel system could be repressurized. The systems of this disclosure can eliminate or reduce the need to know a position of a fuel door since the fueling is blocked until pressures are at an appropriate level.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle fueling control system, comprising:
   a fuel inlet conduit configured to receive a fuel dispensing nozzle; and
   a blocking assembly disposed within the fuel inlet conduit outside the fuel dispensing nozzle, the blocking assembly configured to move back and forth between a fill blocking position that blocks airflow through a port of the fuel dispensing nozzle and a fill permitting position that permits airflow through the port of the fuel dispensing nozzle.

2. The system of claim 1, wherein the port is a Venturi port of the fuel dispensing nozzle.

3. The system of claim 1, wherein the fuel dispensing nozzle extends along a longitudinal axis to a fuel nozzle outlet, wherein the port opens to a radially facing side of the fuel dispensing nozzle.

4. The system of claim 1, further comprising further comprising a deflecting device of the blocking assembly, the deflecting device configured to redirect fuel exiting the fuel dispensing nozzle to an area where the fuel blocks airflow through the port when the blocking assembly is in the fill blocking position.

5. The system of claim 4, further comprising an actuator that transitions the blocking assembly to the fill permitting position in response to a pressure within a fuel tank.

6. The system of claim 5, wherein the deflecting device is rotated by the actuator back and forth between the fill blocking position and the fill permitting position.

7. A vehicle fueling control system, comprising:
   a fuel inlet conduit configured to receive a fuel dispensing nozzle;
   a blocking assembly that is configured to move back and forth between a fill blocking position that blocks airflow through a port of the fuel dispensing nozzle and a fill permitting position that permits airflow through the port of the fuel dispensing nozzle; and
   a clamping device of the blocking assembly, the clamping device contacting the fuel dispensing nozzle to cover the port when the blocking assembly is in the fill blocking position, the clamping device moved to a position spaced from the port when in the fill permitting position.

8. The system of claim 7, wherein the clamping device extends circumferentially about the fuel dispensing nozzle.

9. The system of claim 8, wherein the clamping device includes an inflatable device, the inflatable device more inflated when in the fill blocking position than when in the fill permitting position.

10. The system of claim 9, wherein the inflatable device is more inflated when a pressure inside a fuel tank is higher and is less inflated when a pressure inside the fuel tank is lower.

11. The system of claim 9, wherein the inflatable device inflates and deflates in response to a pressure inside a fuel tank.

12. A vehicle fueling control method, comprising:
transitioning a blocking assembly to a fill blocking position where the blocking assembly blocks airflow through a port of fuel dispensing nozzle and thereby restricts a flow of fuel from the fuel dispensing nozzle to a fuel tank;
transitioning the blocking assembly to a fill permitting position that permits airflow through the port so that the flow of fuel can move from the fuel dispensing nozzle; and
clamping the blocking assembly against the fuel dispensing nozzle when the blocking assembly is in the fill blocking position, and moving the blocking assembly to a position spaced from the port when the blocking assembly is in the fill permitting position.

13. The method of claim 12, further comprising transitioning back and forth between the fill blocking position and the fill permitting position in response to a pressure within the fuel tank.

14. The method of claim 12, wherein the port is a Venturi port of the fuel dispensing nozzle.

15. The method of claim 12, further comprising inflating the blocking assembly to cause the clamping and deflating the blocking assembly to cause the removing.

16. The method of claim 15, wherein an increase in a pressure of a fuel tank inflates the blocking assembly and a decrease in the pressure of the fuel tank deflates the blocking assembly.

17. The method of claim 12, further comprising redirecting fuel exiting the fuel dispensing nozzle to an area where the fuel blocks airflow through the port when blocking airflow.

18. The method of claim 17, further comprising pivoting a deflecting device to a position where the deflecting device provides the redirecting, and pivoting the deflecting device away from the position when removing the blocking.

* * * * *